H. H. DREW.
STOCK WATERING APPARATUS.
APPLICATION FILED JAN. 16, 1919.
1,328,036.
Patented Jan. 13, 1920.
2 SHEETS—SHEET 1.
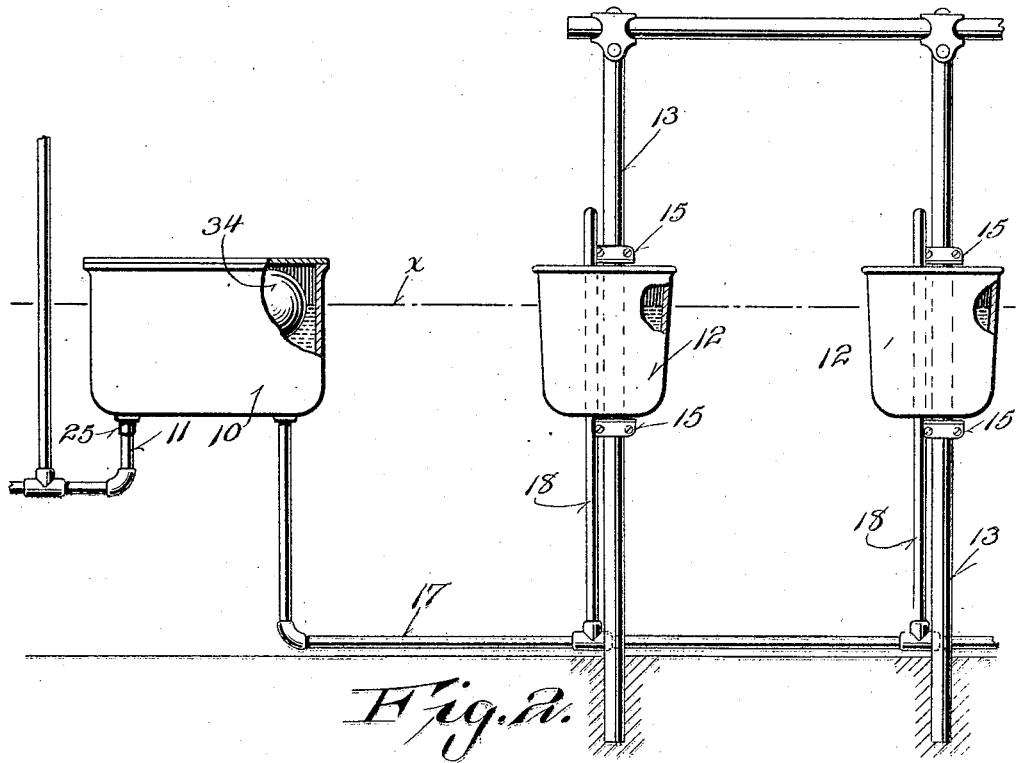
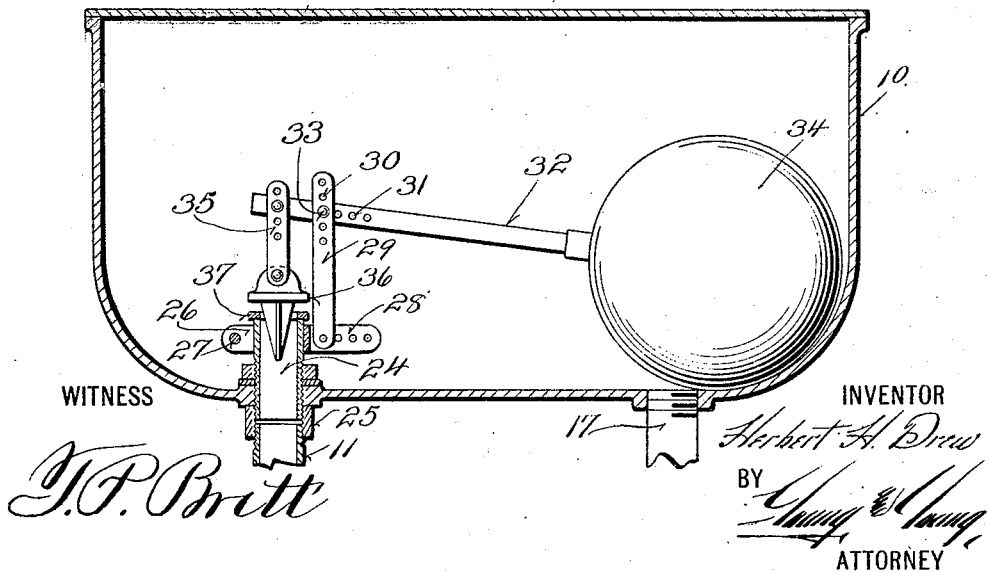
WITNESS
J. P. Britt
INVENTOR
Herbert H. Drew
BY
Young & Young
ATTORNEY

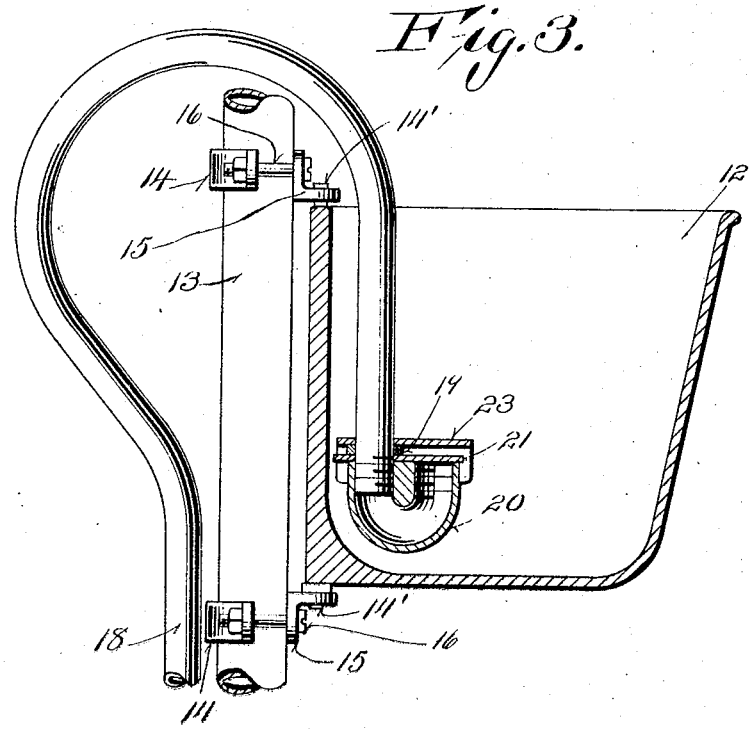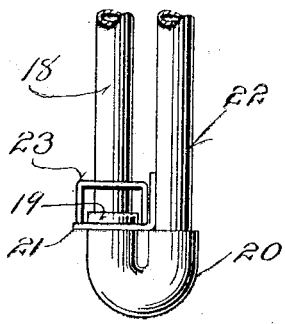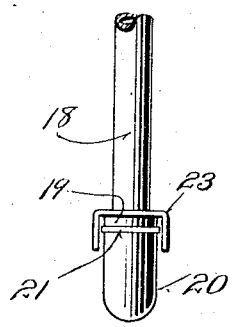

UNITED STATES PATENT OFFICE.

HERBERT H. DREW, OF EDGERTON, WISCONSIN.

STOCK-WATERING APPARATUS.

1,328,036.	Specification of Letters Patent.	Patented Jan. 13, 1920.

Application filed January 16, 1919. Serial No. 271,421.

*To all whom it may concern:*

Be it known that I, HERBERT H. DREW, a citizen of the United States, and resident of Edgerton, in the county of Rock and State of Wisconsin, have invented certain new and useful Improvements in Stock-Watering Apparatus; and I do hereby declare that the following is a full, clear, and exact description thereof.

My invention relates to new and useful improvements in stock watering apparatus of that type including a plurality of drinking cups to which water is supplied from a float tank, the float in said tank maintaining a constant water level whereby a proper level of water is maintained by gravity in the drinking cups, thus requiring but a single control valve for the entire apparatus.

It is primarily the object of my invention to provide an apparatus of this character wherein there is procured a maximum independence of structure with respect to the cups and the supply pipes for said cups whereby to facilitate a most ready manipulation of the cups for various purposes incidental to the use of the apparatus. More particularly, it is my object to provide an arrangement wherein the cups are entirely free from connection with the supply pipes therefor and wherein water is conveyed to the cups by a siphon action.

A more detailed object resides in the provision of an arrangement whereby the individual cups may be adjusted vertically with respect to the supply pipes therefor to vary the amount of water contained in said cups.

A further object resides in the provision of an arrangement wherein the cups are afforded free swinging movement with respect to their supply pipes to render access to the cups more convenient for the cow.

A still further object resides in the provision of a mounting for the cups whereby said cups may be most readily removed.

A still further object resides in the provision in a series of cups supplied with water by gravity from a common source, of means for preventing flow of water from one cup to the other in the event that the level of water in one or more of the cups nearest to the source of supply is lowered.

A still further object in connection with the siphon action resides in the provision of means for preventing loss of the siphon action.

A still further and more general object is to simplify the structure of apparatus of this character and to provide for a most ready installation thereof.

With the above and other objects and advantages in view, my invention resides more particularly in the novel combination, formation and arrangement of parts hereinafter described and pointed out in the appended claims.

In the accompanying drawings:

Figure 1 is an elevational view of a stock-watering apparatus embodying my invention.

Fig. 2 is a vertical longitudinal sectional view through the float tank.

Fig. 3 is a vertical sectional view through one of the drinking cups.

Fig. 4 is an elevational view of the discharge end portion of one of the siphon pipes with a suction member engaged therewith.

Fig. 5 is an end view of what is shown in Fig. 4, the guard plate being lowered.

Referring now more particularly to the drawings, there is provided a float tank 10 having a float valve mechanism therein for maintaining water at a constant level indicated by the line X and this tank is continuously supplied by a pipe line communicating with any suitable source procuring a constant pressure head.

12 designates each of a plurality of drinking cups, and it is particularly noted that these drinking cups comprise simple castings and are provided with no apertures whatever.

For adjustably securing each of the cups to stanchion frame posts 13 or other suitable supports, a pair of clamps are provided, each comprising an arcuate post engaging section 14 and an angle plate section 15, bolts 16 being passed through the ends of said sections.

Vertical alined pintles 14' are provided on one side of the cup which are engaged in the outstanding portions of the angle plates 15 and thus a mounting is afforded the cup permitting free pivotal movement in either horizontal direction. The clamps may be readily adjusted vertically on the posts and it is noted that the cup may be removed by loosening a single bolt of the lower clamp.

A supply pipe line 17 depends from the float tank 10 and is extended along the line of stalls. Adjacent each cup supporting post 13, a siphon 18 rises from the supply pipe line, the upper end of the siphon pipe being bent away from the cup and then curved inwardly and downwardly to provide a fairly wide siphon arch, the end portion of the pipe depending into the cup and being spaced from its wall whereby to permit an ample degree of horizontal pivotal movement of the cup. The extremity of the siphon pipe is threaded and spaced a short distance above the bottom of the cup and disposed thereon is a nut 19 forming a stop member.

One leg of a U-shaped pipe fitting 20 is also threaded on the extremity of the siphon pipe and forms an air trap preventing loss of the siphon action in the event that the level of water in the cup should be lowered below the discharge point of the siphon.

Flow of water from the cup through the siphon pipe such as might be occasioned by lowering of the water level in cups adjacent the supply tank, is prevented by a flexible valve member 21 having one end portion engaged on the siphon pipe and confined between the nut 19 and the U-shaped fitting 20 and having its other end portion engageable over the other leg of the U fitting. The other leg of the U fitting is threaded for engagement therein of any suitable suction member 22 for initially procuring or restoring the siphon action.

The valve member 21 and the discharge mouth of the U fitting is protected by a channel plate 23, the siphon pipe being passed through one end portion of the bight of said plate whereby the plate normally rests upon the stop nut 19, being thus spaced from the valve member 21 with its sides embracing the legs of the U fitting. This guard plate 23 may be readily lifted and swung to clear the discharge leg of the U fitting, as shown particularly in Fig. 4.

It is highly desirable to provide an exceedingly simple and effective valve mechanism for the float tank, in view of the water supply conditions usually present in the use of my apparatus, and to this end the float tank is provided with a valve seat nipple 24 which is threaded in its bottom and connected by a coupling 25 with the primary supply pipe line.

A split band 26 is clamped by a bolt 27 on the upper portion of this nipple and said band carries an outwardly extending arm 28 from which rises a bar 29 provided with a series of apertures 30 in its upper portion coacting with a series of apertures 31 in a lever 32 for the selective reception of a pivot bolt 33, connection being thus adjustable within a comparatively wide range. One end of the lever 32 carries a float 34 and to its other end is adjustably pivoted a link 35 which depends therefrom and pivotally carries a valve member 36 including a flanged head portion from which depends a ribbed tapered portion shaped like a spear head, which projects into the valve seating nipple and which is surrounded by a seat washer 37 seating on the top of the nipple, this washer being held in place loosely by the spear head portion of the valve member, and it is noted that as the valve member moves downwardly, the washer 37 is centered for proper sealing engagement by the flange of the valve member to effectively close the valve.

Reviewing now the general structure of my apparatus, it is seen that an exceedingly simple arrangement is procured effecting a positive and adequate supply of water to the individual cups, yet in such manner that manipulation of the cups may be most readily had, and the cups moved vertically or horizontally, or entirely detached without effecting the water supply means therefor. I thus eliminate the difficulty common in devices of this general character to the connections between the cups and water supply pipes.

While I have shown and described a preferred embodiment of my invention, it will be appreciated that changes and modifications of structure may be resorted to without departing in any manner from the spirit of the invention, as defined in the combination claims.

I claim:

1. A stock watering apparatus including a support, a cup mounted on said support to swing on a vertical axis, a constant level source of water supply, a siphon pipe connected with said source of water supply and extended rearwardly of the cup to a point thereabove and having its discharge end portion bent forwardly depending into the cup adjacent and inwardly of the pivotal axis of the cup, said supply pipe being spaced from the wall of the cup to permit free swinging movement of the cup on said vertical axis thereof.

2. In a structure of the class described, in combination, a cup, a supply pipe depending into the said cup, a U-shaped tubular member having one end threaded on the lower end of the discharge pipe, a stop on the discharge pipe and a flexible valve member secured on the discharge pipe between said stop and the U-shaped member and engageable on the end of the other leg of the U-shaped member to close said member.

3. In a structure of the class described, in combination, a cup, a supply pipe depending into the said cup, a U-shaped tubular member having one end threaded on the lower end of the discharge pipe, a stop on the discharge pipe, a flexible valve member secured on the discharge pipe between said stop and the U-shaped member and engageable on the end of the other leg of the U-shaped member to close said member and a channel plate having one end of its bight portion apertured to loosely receive the discharge pipe, said channel plate normally seating on the stop member with its sides embracing the U-shaped member.

In testimony that I claim the foregoing I have hereunto set my hand at Edgerton, in the county of Rock and State of Wisconsin.

HERBERT H. DREW.